US008576173B2

(12) United States Patent
Verhaegh

(10) Patent No.: US 8,576,173 B2
(45) Date of Patent: Nov. 5, 2013

(54) AUTOMATICALLY ADAPTABLE VIRTUAL KEYBOARD

(75) Inventor: Wilhelmus Franciscus Johannes Verhaegh, Eindhoven (NL)

(73) Assignee: Koninklijke Philips N. V., Eindhoven (NL)

( * ) Notice: Subject to any disclaimer, the term of this patent is extended or adjusted under 35 U.S.C. 154(b) by 1778 days.

(21) Appl. No.: 10/519,055

(22) PCT Filed: Jun. 20, 2003

(86) PCT No.: PCT/IB03/02955
§ 371 (c)(1),
(2), (4) Date: Dec. 22, 2004

(87) PCT Pub. No.: WO2004/006080
PCT Pub. Date: Jan. 15, 2004

(65) Prior Publication Data
US 2005/0225538 A1    Oct. 13, 2005

(30) Foreign Application Priority Data
Jul. 4, 2002    (EP) .................................... 02077694

(51) Int. Cl.
*G06F 3/02*     (2006.01)
*G09G 5/00*    (2006.01)

(52) U.S. Cl.
USPC .......................................... 345/168; 715/773

(58) Field of Classification Search
USPC ................................ 345/156, 157, 168–178; 178/18.01–18.11; 715/773
See application file for complete search history.

(56) References Cited

U.S. PATENT DOCUMENTS

| 4,725,694 | A | * | 2/1988 | Auer et al. ..................... 345/173 |
| 4,763,356 | A | * | 8/1988 | Day et al. ..................... 379/368 |
| 5,010,323 | A | * | 4/1991 | Hoffman ....................... 345/178 |

(Continued)

FOREIGN PATENT DOCUMENTS

| EP | 0817000 A1 | 1/1998 |
| EP | 0967542 A  | 6/1998 |

(Continued)

OTHER PUBLICATIONS

Gantenbein, Soft adaptive follow-finger keyboard for touch-screen pads, Nov. 1, 1993, IBM TDB, V36 n11 Nov. 1993, p. 5-8.*

(Continued)

*Primary Examiner* — Sumati Lefkowitz
*Assistant Examiner* — Robert E Carter, III

(57) ABSTRACT

The invention relates to a data processing device (100) enabling a user to input characters, the device comprising a touch-sensitive member (200) arranged to function as a virtual keyboard, said member including at least one touch sensor (160) for detecting touched zones on said member. The device further comprises key allocation means (110) for allocating at least two reference keys (220) of the virtual keyboard in response to said detection of the touched zones. The device comprises at least one pressure sensor (170) for sensing a finger (250) causing a force on the touch-sensitive member higher than other fingers when more than one finger touches said member. A recognition of a key stroke may be realized. The reference keys may be reallocated upon a user's request or detection of a predetermined condition. The invention also relates to a method of enabling a user to input characters.

12 Claims, 2 Drawing Sheets

(56) References Cited

U.S. PATENT DOCUMENTS

| | | | |
|---|---|---|---|
| 5,122,786 A * | 6/1992 | Rader | 345/168 |
| 5,565,894 A * | 10/1996 | Bates et al. | 345/178 |
| 5,581,243 A * | 12/1996 | Ouellette et al. | 345/173 |
| 5,612,718 A * | 3/1997 | Bryan | 345/168 |
| 5,767,842 A * | 6/1998 | Korth | 345/168 |
| 5,982,302 A | 11/1999 | Ure | |
| 6,121,960 A * | 9/2000 | Carroll et al. | 345/173 |
| 6,130,665 A * | 10/2000 | Ericsson | 345/173 |
| 6,359,572 B1 | 3/2002 | Vale | |
| 6,388,657 B1 * | 5/2002 | Natoli | 345/168 |
| 6,414,674 B1 * | 7/2002 | Kamper et al. | 345/173 |
| 6,525,717 B1 * | 2/2003 | Tang | 345/177 |
| 6,882,337 B2 * | 4/2005 | Shetter | 345/173 |
| 6,943,776 B2 * | 9/2005 | Ehrenburg | 345/168 |
| 7,042,442 B1 * | 5/2006 | Kanevsky et al. | 345/169 |
| 2001/0040550 A1 | 11/2001 | Vance et al. | |
| 2002/0054120 A1 | 5/2002 | Kawano et al. | |
| 2003/0208324 A1 * | 11/2003 | Bellwood et al. | 702/41 |

FOREIGN PATENT DOCUMENTS

| | | |
|---|---|---|
| JP | 1063426 A | 3/1989 |
| JP | 7325655 A | 12/1995 |
| JP | 9330175 A * | 12/1997 |
| WO | 9950737 A1 | 10/1999 |
| WO | 0035091 A1 | 6/2000 |
| WO | 0131788 A1 | 5/2001 |

OTHER PUBLICATIONS

Certified Engish translation for JP 9330175A (Hataeyama et al.) translated by the Mcelroy Translation Company, Oct. 2007.*

* cited by examiner

AUTOMATICALLY ADAPTABLE VIRTUAL KEYBOARD

The invention relates to a data processing device enabling a user to input characters, the device comprising a touch-sensitive member arranged to function as a virtual keyboard, said member including at least one touch sensor for detecting touched zones on said member.

The invention also relates to a method of enabling a user to input characters, comprising a step of detecting touched zones on a touch-sensitive member arranged to function as a virtual keyboard.

Document U.S. Pat. No. 6,121,960 discloses a screen peripheral system including a touch-activated input device for generating and displaying a composite image visible to a user. The composite image simultaneously includes a representation of at least one key, a Qwerty keyboard, for activating an input function, and a main image provided by a computing device. The keyboard representation is preferably laid over the main image. Characters of the keyboard themselves, e.g. letters associated with each key or zone, can be turned off if the user has memorized the keyboard layout, for example. The keyboard can be used without being visible at all to the user who can type effectively without even seeing representations of the keys/zones themselves. In that case, the user can only rely on his memory where the keyboard is located, and thus many problems arise. It is likely that after some time of typing on such a screen, the user cannot find a desired key or makes many mistakes by pressing the wrong, invisible keys. If the user takes his hands away from the screen, he may easily forget the position of the invisible keyboard on the screen. If the user is provided with the representation of the keyboard, he should keep looking on the screen to ensure correct typing.

It is an object of the invention to provide a data processing device of the kind defined in the opening paragraph which enables the user to input the characters in an improved and more user-friendly manner not involving the drawbacks of the prior art.

This object is realized in that the device comprises key allocation means for allocating at least two reference keys of the virtual keyboard to respective zones on said member in response to said detection of touched zones.

Whenever the user would like to use the virtual keyboard for inputting characters, he touches the touch-sensitive member with his fingers. The touch-sensitive member senses zones on said member touched with the fingers. The virtual keyboard may have the reference keys, e.g. keys serving as the reference when typing, for instance "F" and "J" keys of a standard Qwerty keyboard. Upon detecting of the fingers touching the member, the key allocation means allocates at least two reference keys to the detected zones. Thus, the device "knows" where the reference keys of the virtual keyboard are located on the touch-sensitive member, and what is a function of said reference keys. It is an advantage of the present invention that the user may define the location of the reference keys on the touch member according to his preference.

A layout of the virtual keyboard, such as Qwerty, Germany Qwertz, France Azerty etc, may be predetermined in the device, so that a position and the function of keys, other than the reference keys, is known with respect to said reference keys. A size, form etc. of the keys may also be known. Thus, zones on the touch-sensitive member corresponding to the non-reference keys can be determined. The key allocation means can allocate the keys other than the reference keys to the corresponding zones on the member. In that way, the positions, the corresponding zones, of all keys of the virtual keyboard on the touch-sensitive member are known. It is an advantage of the present invention that actually the user himself sets the position of the virtual keyboard on the touch-sensitive member. The position of keys is related to the position of the reference keys, not to borders, form, shape, etc. of the touch-sensitive member.

The user may use the device according to the present invention in different ways. The touch-sensitive member may further comprise display means, known in the prior art as touch-sensitive screen, arranged to display a representation of at least one reference key and/or other key of the virtual keyboard. Some users can type with more than one finger, e.g. typing with ten fingers, and without looking at the keyboard, typing blindly.

It is another object of the invention to provide an advanced means for recognizing key strokes of the virtual keyboard. This object is realized in that the data processing device further comprises at least one pressure sensor for sensing a force of at least one finger on the touch-sensitive member. Using said pressure sensors, a finger causing a force on the touch-sensitive member higher than other fingers can be identified when more than one finger touches said member. The device comprises key stroke recognition means arranged to recognize a key stroke, for example by analyzing a relative position of the zone touched with the higher force with respect to a position of at least one other zone touched with a lower force. Only said relative position is required to be known, an absolute position of the fingers need not necessarily be determined. Indeed, if said relative position and keys corresponding to the position of the fingers which cause the low force are known, a key corresponding to a zone touched by the finger which cause the high force can be easily determined because the position of all keys can be found, as discussed above. The keys corresponding to the position of the fingers which cause the low force may be known, for example, when said fingers which cause the low force are positioned on the reference key zones of the touch-sensitive member. The user may type "blindly", using the well-known ten-finger method.

According to a further aspect of the present invention, the data processing device may comprise key correction means for correcting the location of at least one reference key by repeatedly allocating at least one reference key. In other words, one or more reference keys can be re-allocated upon a request of the user or, for example, because a substantial change of position of the user's fingers which cause the lower force on the touch-sensitive screen from at least one reference key was detected. Thus, the new position of the virtual keyboard on the touch-sensitive member is determined, and the user can start using the keyboard in a new location on the member.

The object of the invention is also realized in that the method of enabling the user to input characters comprises a step of allocating at least two reference keys of the virtual keyboard in response to said detection of touched zones. The method describes the operation of the data processing device of the invention.

These and other aspects of the invention will be further elucidated and described with reference to the accompanying drawings, wherein.

Throughout the Figures, identical reference numerals indicate identical or corresponding components.

Figure 1:
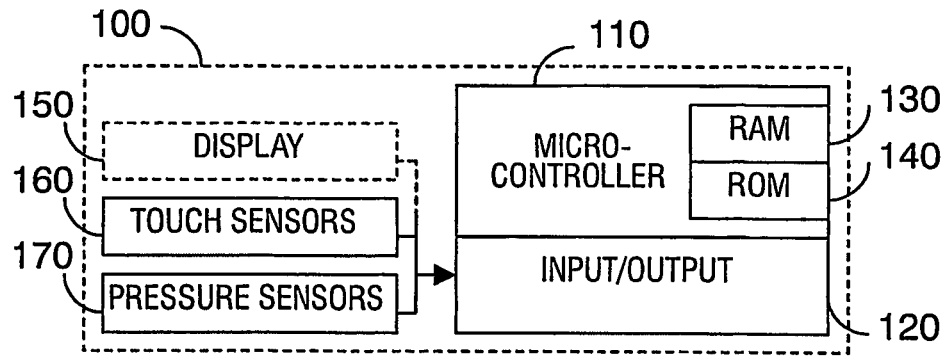
FIG. 1 shows a functional block diagram of the data processing device suitable for implementing the present invention.

With reference to FIG. 1, an example of a hardware implementation of the data processing device 100 according to the present invention is shown. The device comprises a microcontroller 110 having an input/output function 120 through which touch sensors 150, optional pressure sensors 160 and display means 170 are interfaced to said microcontroller. The touch sensors 150 and pressure sensors 160 may be used as an overlay for the display means 170 as known from in the prior art. The touch sensors, pressure sensors and display means may also be unrepeated items provided by the same device. The microcontroller 110 has an embedded random access memory 130 and an embedded read only memory 140, which is used for program storage. When a program stored in the memory 140 is executed, the microcontroller 110 functions as will be described further. The blocks in FIG. 1 are well known in the prior art and are not further discussed herein. The device 100 may be equipped with other means known to the skilled person.

Figure 2:
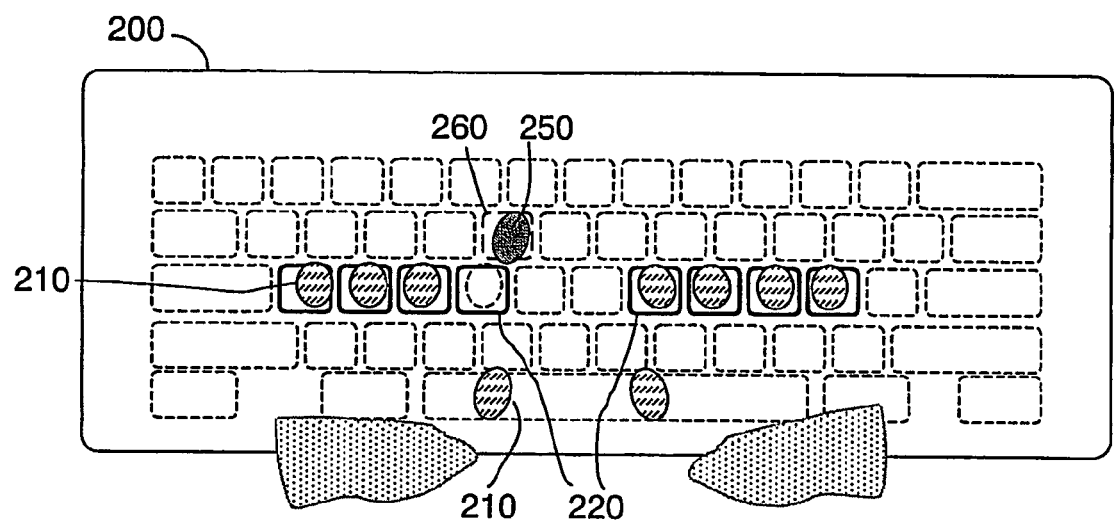
FIG. 2 shows an embodiment of a virtual keyboard with keys allocated on a touch-sensitive member of the data processing device according to the present invention.

According to the invention, the device 100 enables a user to use a virtual keyboard for input characters. The keyboard is not presented visually but is enabled with a touch-sensitive member, a touch pad, comprising the touch sensors. When the user would like to use the touch pad as the virtual keyboard, he may simply put at least two fingers on the pad in a position in which the user can type or use the keyboard otherwise, as is shown with reference to FIG. 2. Thus, the device may sense the user's fingers being in a "reference position" and touching zones on the pad 200, the number of which may correspond to the number of the user's fingers. These zones on the pad 200 are detected by the touch sensors 160. Preferably, the user touches the pad 200 with at least two fingers so that at least two touch zones are detected. The microcontroller 110 is arranged to function as key allocation means for allocating reference keys of the virtual keyboard to the detected touch zones, wherein the number of keys may be equal to the number of the detected zones. At least some keys of the virtual keyboard are given some function so that the user can realize a desired input by using these keys. The virtual keyboard may have a predetermined layout such as Qwerty, Germany Qwertz, France Azerty etc defining the position, size and functionality of each key of the keyboard. Many alternative layouts of the keyboards are known as well. For example, a "Dvorak" keyboard layout and "Darwin" keyboard layout are an ergonomic alternative to the layout commonly found on typewriters and computers known as "Qwerty". The keyboard layout may also vary for different countries.

The touch sensors of the touch pad 200 may be arranged as an array of the sensors sensing a touch. A resolution of said array does not need to be very high but should be sufficient for the purpose of sensing the touch with an acceptable accuracy. The array of the sensors may be arranged to determine a parameter of the zone on the pad touched by the finger, a finger-mark 210. The parameter may be a physical dimension of the zone, e.g. a width, length, form, square area, etc. By such measuring of the zone of the finger-mark, a size of the reference key 220, which is sufficiently convenient for use by the particular user can be determined. A width of the keys may be variable for more efficient use. The width may be determined depending on the size of the detected finger-marks and/or distance between the detected fingers.

In one example, the size of the reference key may be proportional to the size of the finger-mark. Obviously, the area of the key 220 should not be smaller than the area 210 of the detected finger-mark. When the size of the reference keys is found, the area of each reference key is determined on the pad. Preferably, the area of the key substantially covers the area of the corresponding finger-mark on the pad, whereas a position of the reference keys with respect to each other is in accordance with the predetermined layout. The memory 140 may store different keyboard layouts having different forms of the keys, or only reference keys. For example, the keyboard layouts with keys having rectangular, round, rectangular with round corners, oval, etc. forms may be predetermined and stored. The form of the keys may be dependent on a form of the detected finger-mark. Further details of allocating the reference keys to the detected touch zones will be apparent to the person skilled in the art.

Keys of the keyboard other than the reference keys can be easily allocated on the touch pad when the reference keys have already been allocated by the key allocation means, and the layout of the virtual keyboard to be used is known. If the layout is selected, a size, position, etc. of the keys with respect to each other is also known. For example, according to one layout of the keyboard, a height of all keys should be the same, therefore if the height of the reference keys has been determined, the size of other keys is also known. The size and position of the other keys may be dependent on the size and distance between the reference keys. In other words, the size of the other keys may be proportionally scaled to the size of the reference keys.

The virtual keyboard may have the Qwerty layout and be adapted for ten-finger typing, wherein four fingers are placed on the right reference keys and four fingers on the left reference keys.

In some cases, a vertical distance between the keys should be determined in such a way that the keyboard is convenient to be used by the user. In that case, a size of the finger-mark of the user's thumbs may also be determined by the touch sensors if the thumb touching the pad was detected. The keys of the keyboard may be allocated, the size of the keys is scaled, in such a way that the thumb is found in a position which is standard for the given keyboard layout. For example, a standard position of the thumb of the user typing blindly on the Qwerty keyboard is on the "space bar".

Figure 3:
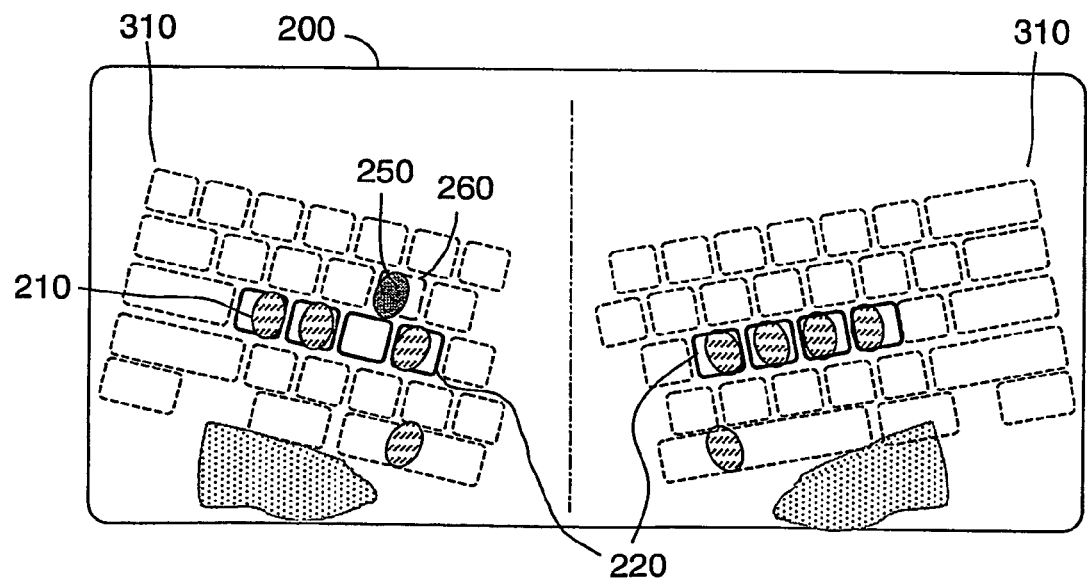
FIG. 3 shows an embodiment of the virtual keyboard with two groups of the allocated keys having a different orientation on the touch-sensitive member.

Nowadays, various ergonomic keyboards which can be arranged in different ways are well known. The keyboard may be split into sections, for instance, alphanumeric and cursor keys, or left and right alpha keys and a 10-key. The sections may be separated for each hand to reduce muscular tension in the user's shoulders and arms. The keyboard may be split into two parts arranged in any order the user desires that the hands could be kept in a natural position. FIG. 3 shows such a keyboard has two groups of keys 310 and 320, in other words, the keyboard is split into two half-keyboards. The groups of keys, for instance two half-keyboards, as a whole can be tilted into any position. Each group of keys may have at least one reference key. The split keyboard can be adjusted and tilted at any angle to have different orientations on the touch pad depending on the position of the reference keys 220. In turn, the position of the reference keys is determined by the position of the user's fingers 210 when detected by the touch sensors 160. The order of the keypads can also be swapped. Distances between parts of the split keyboard can also be adjusted as the user desires. The left and right groups of keys 310 and 320 may be symmetric with respect to each other. Thus, the split keyboard adapted to the user's preferences decreases the lateral deviation of the hands, matches the natural angle of the hands and arms, greatly reduces forearm tension and has a positive influence on the user. Generally speaking, the layout of the keyboard may be varied to match a layout of the user's hands.

According to the further aspect of the present invention, the device 100 has pressure sensors 170 for sensing a force of at least one user's finger on the touch-sensitive member 200. The pressure sensors can identify a finger 250 causing a force on the touch-sensitive member higher than other fingers when more than one finger touches said member. Thus, one finger 250 causing the high force and other fingers pressing on the touch member with a low force can be distinguished. Therefore, a stroke of the high-force finger is identified. However, a key corresponding to the stroke may still need to be determined. The microcontroller 110 can function as key stroke recognition means for recognizing a key stroke. One of the ways to recognize the keystroke is to analyze a relative position of a zone 260 touched with the higher force with respect to a position of at least one other zone touched with the lower force. In other words, the key stroke may be recognized by analyzing the relative position of the high-force finger with respect to the positions of the low-force fingers. For instance, the microcontroller determines the relative position of the zone 260 touched with the high-force finger 250 with respect to the reference zones 220 and retrieves the key allocated by the key allocation means to that zone 260. Thus, the user is assured of correct recognition of the keys of the virtual keyboard he uses. The virtual keyboard having advantages of the present invention is convenient for typing also with ten fingers.

According to a further aspect of the present invention, the microcontroller 110 can function as key correction means for correcting the location of at least one reference key by repeatedly allocating at least one reference key. The correction of the location of the virtual keyboard may be necessary when the user's fingers start shifting from the corresponding reference zones, or the user would like to change the position of the virtual keyboard on the touch-sensitive member, etc. The user may manually activate the function of correcting the keyboard location, for example, by pressing the key or a combination of the keys of the keyboard. Alternatively, said function may be detected automatically, e.g. by detecting a substantial change of position of one or more user's fingers which cause the lower force on the touch-sensitive screen away from at least one reference key or the like.

The present invention as described above does not show to the user any visual representation related to the virtual keyboard which should not be understood as a limitation of the invention.

In one of the embodiments of the present invention, the device 100 may comprise display means 150 arranged to display a representation of at least one reference key and/or other key of the virtual keyboard. Many techniques of manufacturing touch screens comprising touch sensors and display screen are known. Such displaying may be useful for the user in many situations, especially when the user would like to see the zones to which the keys of the virtual keyboard are allocated. In another example, the reference key zones, or all key zones of the keyboard, are highlighted on the screen upon detecting the user's fingers. Thus, the user can see how the keyboard is allocated on the screen, etc. Such a representation may be displayed permanently or only for some time after allocating the keyboard. The characters inputted by the user may also be shown on the display screen as known in the prior art. In one embodiment, the keys may be shown color-coded depending on the frequency of their use by the user.

In fact, the touch pad can be used not only for the virtual keyboard but also in a mouse mode. The device 100 may be arranged to function in a typing mode upon detecting a plurality of fingers touching said touch-sensitive member, and in a pointing mode, a mouse mode, as in a default mode or upon detecting a pointing finger on said touch-sensitive member.

In some cases, the touch-sensitive member may have a flat surface. In one of the embodiments of the present invention, an additional pad is provided on top of the touch-sensitive member for preventing the user's fingers from shifting from the corresponding zones on the touch-sensitive member. The pad may be made of any material avoiding sliding of the pad on the touch member. The additional member may be made from a transparent material. If the user changes the position of the virtual keyboard on the touch-sensitive member, he may subsequently also move the additional pad. The virtual keyboard is not dependent on the position of the additional pad which may simply help the user to have some tangible non-flat surface on the top of the touch-sensitive member. The pad may have in some places, e.g. a rectangular, circular, etc. form, small salience, concavity, rough edges, etc. Of course, the additional pad should not hinder the use of the touch-sensitive member provided with the virtual keyboard according to the present invention.

Figure 4:
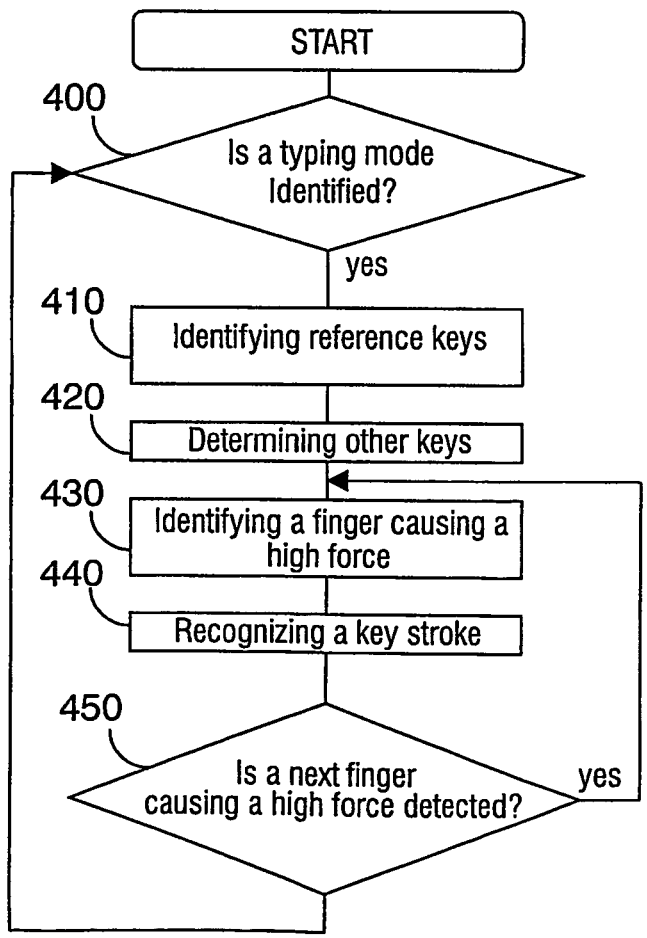
FIG. 4 shows an embodiment of the method of enabling the user to input characters.

FIG. 4 shows an embodiment of the method according to the present invention, describing the operation of the device. In step 400, it is determined whether the user would like to use the virtual keyboard for inputting the characters. If that is the case, the user puts his fingers on the touch-sensitive member and the reference keys are identified at step 410 and allocated as described above. When the location of the reference keys is known, other keys of the keyboard are allocated at step 420. The method further comprises a step 430 of identifying the finger which touches the touch member with the force higher than the other fingers. The key stroke is then recognized and the device identifies which key of the keyboard has been pressed at step 440. Upon recognizing the touched key, the device may further perform the function, operation or other action as known in the prior art. At step 450, another stroke may be detected and steps 430 and 440 may be repeated. If the next stroke is not detected, e.g. for a predetermined period of time, another step may be performed such as deactivating the virtual keyboard upon expiration of some period of time or switching to another mode of functioning of the device such as the mouse mode.

The various program products may implement the functions of the system and method of the present invention and may be combined in several ways with the hardware or located in different devices. Variations and modifications of the described embodiment are possible within the scope of the inventive concept. Thus, for example, the use of the verb 'to comprise' and its conjugations does not exclude the presence of elements or steps other than those defined in a claim. The invention can be implemented by means of hardware comprising several distinct elements, and by means of a suitably programmed computer. In the device claim enumerating several means, several of these means can be embodied by one and the same item of hardware.

A 'computer program' is to be understood to mean any software product stored on a computer-readable medium, such as a floppy-disk, downloadable via a network, such as the Internet, or marketable in any other manner.

The invention claimed is:

1. A data processing device enabling a user to input characters, the device comprising:
 a touch-sensitive member arranged to function as a virtual keyboard, said member including touch sensors for detecting a plurality of touched zones on said member, the touch sensors sensing a force of at least one finger on the touch-sensitive member;

a stroke recognition means which recognizes a key stroke by analyzing a relative position of a zone touched by a finger causing a higher force on the touch-sensitive member relative to positions of zones concurrently touched by other fingers with a lower force, such that the key stroke is determined by the relative position of the higher force touched zone relative to the lower force concurrently touched.

2. The device of claim 1, wherein said virtual keyboard has a QWERTY-type layout.

3. A data processing device for enabling a user to input characters, the device comprising:

a touch-sensitive member arranged to function as a virtual keyboard, said member including sensors for detecting touched zones on said member and for sensing a force of at least one finger on the touch-sensitive member, the sensors being configured to identify a finger causing a force on the touch-sensitive member zone that is higher than a force from other fingers when more than one finger touches said member;

a key allocation means for allocating at least two reference keys of the virtual keyboard to respective zones on said member in response to said detection of touched zones; and a key stroke recognition means configured to recognize a key stroke by analyzing a relative position of the zone touched with a higher force with respect to a position of at least one other zone concurrently touched with a lower force.

4. The device of claim 3, wherein the at least one of the touch sensors is further arranged to determine a parameter of a respective one of the touched zones, said key allocation means being arranged to allocate the reference keys having a size and/or form on said touch-sensitive member depending on said parameter of the respective detected zone.

5. The device of claim 3, wherein said key allocation means is arranged to allocate said other keys having a size and orientation on said touch-sensitive member depending on relative locations of the detected touched sensitive zones.

6. The device of claim 3, wherein said key allocation means is arranged to allocate four or eight reference keys upon detecting four fingers of the user's left hand and/or four fingers of the user's right hand touching the touch-sensitive member.

7. The device of claim 3, wherein said at least one zone touched with the lower force corresponds to at least one of said reference keys.

8. The device of claim 3, further comprising:

a key correction means for correcting a location of at least one of the reference keys by repeatedly allocating at least one of the reference keys.

9. The device of claim 8, wherein said key correction means functions upon detecting a change of position of at least one of said other fingers.

10. The device of claim 3, wherein said touch-sensitive member further comprises:

a display means arranged to display a representation of at least one reference key and/or other key of the virtual keyboard.

11. A method enabling a user to input characters, the method comprising:

a step of detecting touched zones on a touch-sensitive member configured to function as a virtual keyboard, and a step of allocating at least two reference keys of the virtual keyboard to respective zones on said member in response to said detection of touched zones, and, a step of sensing a force of at least one finger on a touched zone of the touch-sensitive member, a step of identifying a finger causing a force on the touched zone of the touch-sensitive member higher than a force caused by other fingers on the touched zone when more than one finger touches said member, and a step of recognizing a key stroke by analyzing a relative position of the zone touched with the higher force with respect to a position of at least one other zone concurrently touched with a lower force.

12. A non-transitory computer-readable medium with instructions that are executed on a computer, to perform the method as defined in claim 11.

\* \* \* \* \*